Oct. 24, 1967 T. A. COOTEY 3,348,607
INDOOR-OUTDOOR COMPENSATED THERMOSTAT
Filed July 13, 1965
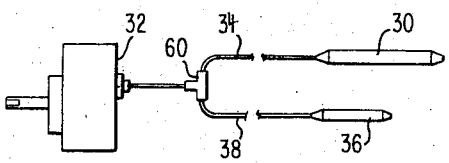
FIG.3
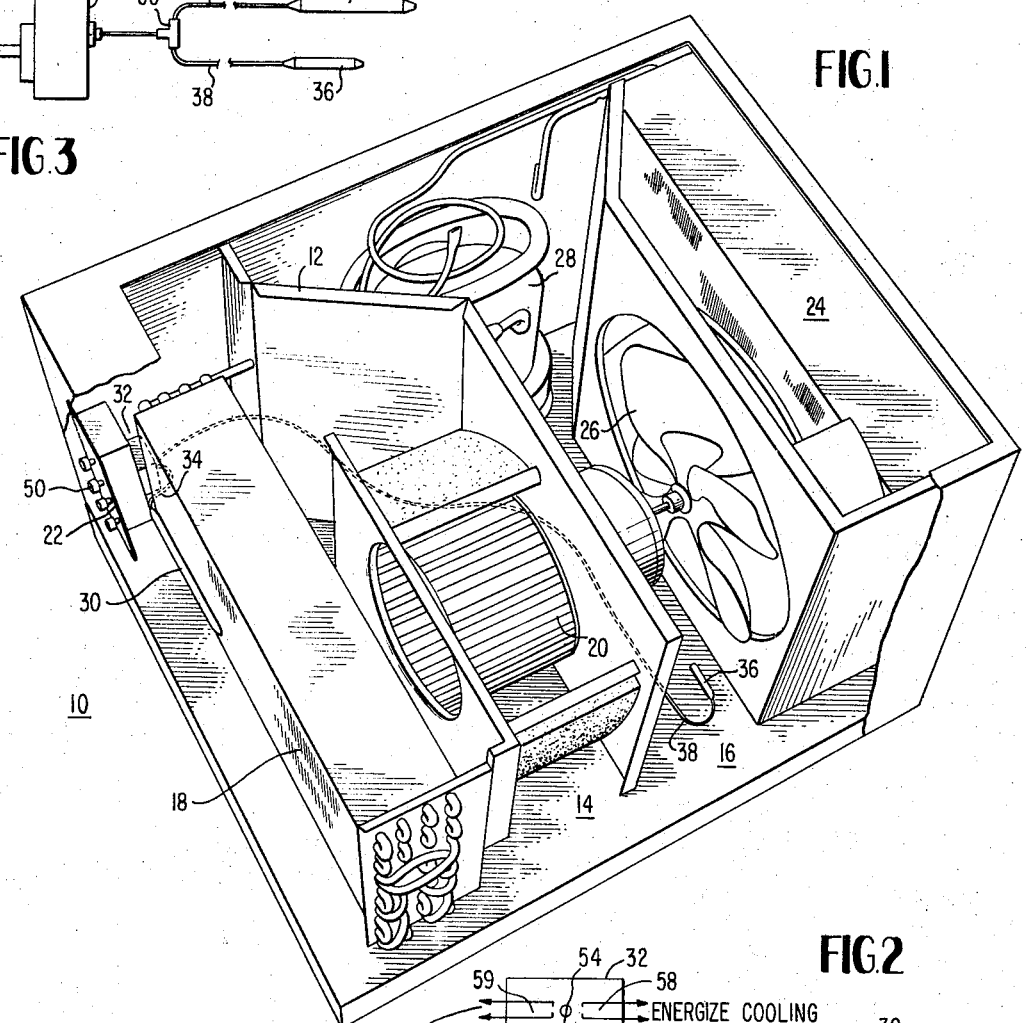
FIG.1
FIG.2
FIG.4
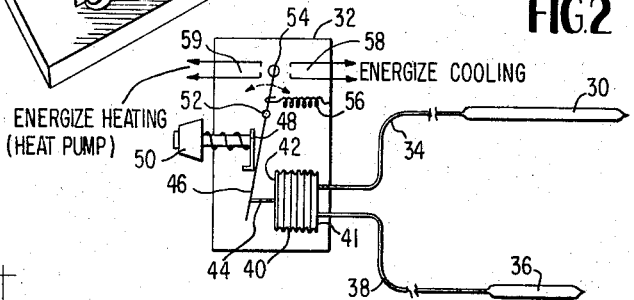
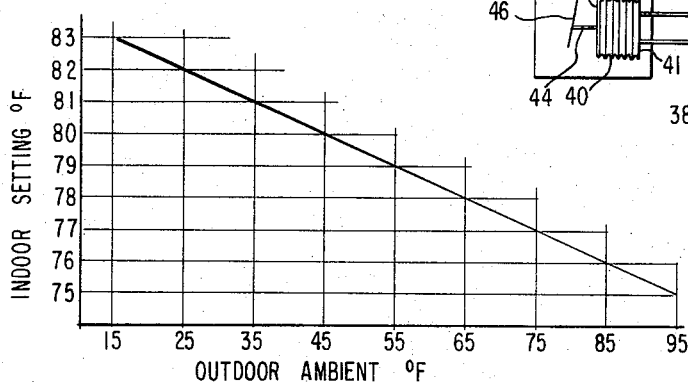
INVENTOR
THOMAS A. COOTEY
Keman, Palmer,
Stewart & Estabrook
ATTORNEYS

United States Patent Office 3,348,607
Patented Oct. 24, 1967

3,348,607
INDOOR-OUTDOOR COMPENSATED THERMOSTAT
Thomas A. Cootey, Rutland, Vt., assignor to Friedrich Refrigerators, Incorporated, San Antonio, Tex., a corporation of Texas
Filed July 13, 1965, Ser. No. 471,607
1 Claim. (Cl. 165—28)

ABSTRACT OF THE DISCLOSURE

An indoor-outdoor compensated thermostat for a heat pump is disclosed by the hereinafter specification. A mathematically proportioned split-bulb temperature sensing means is positioned so as to sense return air and so as to sense the ambient. The split-bulb sensing means is operatively connected to one side of a power element. The power element on its other side is in operative engagement with a spring-biased, pivotally mounted electrical contact member which member is positioned relative to a plurality of heating and cooling electric contacts. In operation the return air and ambient simultaneously influence the movement of the power element to thereby automatically adjust the set point of the thermostat.

---

This invention relates broadly to heat exchangers and more specifically to certain improvements in the apparatus thereof for controlling the cooling and heating of an enclosed space.

Heretofore, thermostatic elements have been employed to control the operation of a heat exchanger in the event that the temperature of the space being either cooled or heated tends to vary from some predetermined point or level. The conventional practice has been to utilize thermostatic elements to sense the temperature of the space being cooled or heated as well as the ambient or outdoor temperature in order to effectively operate a heat exchanger whereby said space will be maintained at a preset temperature level.

In the past, thermostats used to control heat exchangers have been somewhat deficient in their ability to control and maintain a desired comfort level in certain areas, such as a room. It has been found that prior art thermostats have not been able to modulate the predetermined level of operation of a heat exchanger in accordance with changes in the outdoor temperature so as to maintain a comfortable indoor temperature. As an illustration of the point under consideration, air conditioners are generally provided not only with a thermostatic sensing bulb, placed in the path of return air, but also with suitable temperature setting means, such as switches or the like, whereby the user may set the air conditioner to operate at some predetermined point that is considered comfortable. The thermostatic sensing element is usually connected to a power element that is adapted to operate a power switch. Any temperature changes in the return air cause pressure changes in the sensing bulb which are translated into rectilinear movement by the power element for the purpose of operating the power switch.

The prior art discloses means for actuating an air conditioner upon an increase in temperature within the space being controlled, in that, a temperature rise of the return air will cause an increase in pressure in the sensing bulb resulting in an expansion of the power element and the operation of the power switch. After the air conditioner has been running for a period of time, the temperature of the return air will be reduced, the pressure in the sensing element will decrease causing the power element to contract so that the air conditioner is turned off. Normally, the user of an air conditioner equipped with a thermostat of the aforementioned type will set the thermostat to operate under daytime conditions. However, if the air conditioner has been so set and is then operated during the night, the temperature of the controlled space during the early morning hours will be uncomfortably cold. The foregoing would result in a change of the comfort level of the controlled space during the night due to a decrease in temperature of the outdoor ambient air. This same problem would also exist if the air conditioner were to operate in a reverse or heating cycle during the winter months. This situation would develop if the air conditioner/heat pump is set to operate during the daylight hours when the outdoor ambient is somewhat higher than during the night hours. Since the temperature drops during the night, the enclosed space will again be uncomfortably cold in the early morning hours as the daytime comfort level is not compatible with the nighttime outdoor ambient.

The thermostat of the present invention is so designed as to be readily capable of modulating the temperature of the space being heated or cooled in accordance with changes in the outdoor ambient. The foregoing result is accomplished, in one embodiment of the present invention through the use of a split-bulb or dual-bulb thermostat or sensing element wherein one of the sensing elements is located in the path of return air and the other in the outdoor or ambient air. The two temperature sensing elements are connected directly to a power element, the latter being utilized to operate a power switch of a heat exchanger. In the preferred embodiment of this invention, the temperature sensing elements are mathematically proportioned in size relative to each other. The indoor bulb provides approximately nine-tenths of the total control over the power element whereas the outdoor bulb provides the remaining one-tenth of the control. Thus, it will be seen that both sensing elements transmit motion to a single power element in response to changes in the temperature of the air affecting said elements.

One of the objects of the present invention is to provide a compensated thermostat having a pair of sensing elements, one of said sensing elements being located in the ambient air and the other being located in the path of return air for the purpose of modulating the operation of a heat exchanger in accordance with changes in both inside and outside temperatures.

A more specific object of the present invention is to provide a dual thermostatic control sensing element for a low power air conditioner whereby the operation of the air conditioner is modulated in accordance with indoor and outdoor temperatures.

Another object is to provide a power heating unit having a dual bulb thermostatic control unit whereby the heat output of said heating unit is modulated by said control unit in accordance with the indoor and outdoor temperatures.

Other objects and advantages, more or less ancillary to the foregoing in the manner in which all of the various objects are realized, will appear in the following description which, when considered in conjunction with the accompanying drawing, sets forth the preferred embodiment of the invention.

Referring to the drawings wherein the preferred embodiment of the invention is illustrated:

FIGURE 1 is an isometric view showing an air conditioner having a dual-bulb thermostatic control as embodied in the present invention;

FIGURE 2 is a schematic representation of the thermostat of this invention;

FIGURE 3 is a schematic representation of another embodiment of the thermostat of this invention; and, FIGURE 4 is a temperature chart showing the relations of temperature within the space being controlled as they relate to the outdoor ambient.

Referring to FIGURE 1, there is shown in the drawing an air conditioner 10 having a transversely extending sepentined-shaped wall 12 which divides the air conditioner into an indoor compartment 14 and an outdoor compartment 16. The indoor compartment 14 contains the usual evaporator 18, evaporator fan 20 and control panel 22. The indoor compartment 14 will at all times be subjected to whatever temperature is maintained in the space being cooled or heated. The outdoor compartment 16 contains the usual condenser 24, condenser fan 26, and compressor 28.

The evaporator 18 has positioned in the front thereof a temperature sensing element 30 which is in the path of the return air. In the preferred embodiment of the invention, the temperature sensing element 30 is a thermostatic bulb communicating with a control box 32 through a capillary tube 34, with the control box 32 being mounted adjacent to the control panel 20. The outdoor compartment 16 contains a sensing bulb 36 of the thermostatic type which is also in communication with the control box 32 through capillary tube 38. The sensing bulb 36, being located in the outdoor compartment, responds to changes in the temperature of the outdoor ambient.

Referring now to FIGURE 2, the temperature sensing elements 30 and 36 are connected by their respective capillary tubes 34 and 38 to a power element 40, which is located inside the control box 32. The power element 40 is shown as an expansible-contractible chambered member having movable end walls 41 and 42 with a thrust rod 44 being mounted on the wall 42. The thrust rod 44 is connected to one end of a link 46 that is biased by a contact member 48, which is connected to and actuated by a control knob 50 mounted on the control board 20, FIGURE 1. The link 46 has its other end connected to a member 52 for pivotal movement about and with respect to said member. A second link 54 has one end connected to the member 52 for pivotal movement thereabout so that the two links will move as a single member or unit about member 52. The link 54 is biased by a spring 56 with the free end of the link positioned between a cooling switch 58 and a heating switch 59.

Thus, upon an initial setting of the control knob 50 the link arm 54 will be positioned relative to the switch 58 when the heat exchanger is being used as an air conditioner. When the heat exchanger is used as a heater, the link arm 54 will be positioned relative to switch 59. The arm 54 is retained in this position by the spring 56 during the action of the biasing member 48 on the link 46. Since the thrust rod 44 of the power element 40 also acts on the link 46, any movement of the link 46 caused by the contraction or expansion of the power element 40 will change the relative distance separating the link 54 from the switches 58 and 59. For example, a drop in pressure on the bulb 36 will cause a corresponding pressure decrease in the power element 40 resulting in movement of end wall 42 to the right and causing the link 46 to swing in a counterclockwise direction around the pivotal point 52. The link 54 turns contemporaneously with link 46 and will also move in a counterclockwise direction around member 52 against the bias of spring 56. Under the circumstances just given, the link 54 is moved away from the switch 58, thus raising the set point temperature from that initially set on the thermostat with the control knob 50. The reverse of the foregoing would also be true if the power element 40 were to expand and thus move thrust rod 44 to the left so that the link 46 would move in a clockwise direction, causing the link 54 to also swing in a clockwise direction, thereby decreasing the distance between the link 54 and the switch 58, thus effecting a lowering decrease in the indoor set point.

It will be obvious, from the foregoing, that both bulbs, the one located in the path of return air and the other subject to the ambient air, will affect the positioning of the link members and therefore, the operation of the heat pump. Although the bulb members 30 and 36 are shown as being separately attached to the end wall 41 of the power element 40, it will be readily apparent that the capillaries 34 and 38 may be joined with a junction that communicates with the power element 40. This configuration is shown in FIGURE 3 wherein the bulbs 30 and 36 are joined by their capillaries 34 and 38, respectively, to a junction 60, which in turn communicates with the control box 32.

Referring to FIGURE 4, it will be seen that as the outdoor ambient changes from 95° F. to 15° F., the indoor setting on the thermostat will increase from 75° F. to 83° F. Conversely, if the outdoor ambient were to rise from 15° F. to 95° F., the indoor set point would fall from 83° F. to 75° F. To illustrate the operation of the thermostat, it will be assumed that the outdoor ambient was 75° F. and that the control knob 50 was positioned to where the indoor set point was 77° F. In addition to the foregoing, it will also be assumed that several hours have passed since the initial setting was placed on the thermostat and during that time interval, the outdoor ambient fell 10° to 65° F. It is to be understood that the following sequence of operations occurred contemporaneously with the 10° decrease in the outdoor ambient and have been set forth for purposes of illustration only. As the temperature fell, the pressure maintained by the outdoor bulb 36 on the power element 40 is reduced resulting in a contraction of that element with a consequential movement to the right, FIGURE 2, of the thrust rod 44, resulting in a counterclockwise turning of the links 46 and 54 about the pivot 52. The link 54 is now set at a distance from the switches, i.e., away from the switch 58 and towards the switch 59, corresponding to a set point temperature for indoor comfort of 78° F. The heat exchanger will be operated only in the event the indoor temperature deviates from a set point of 78° F. and this operation will be controlled by the temperature of the return air on the bulb 30. Therefore, if the return air temperature is below 78° F., the lower pressure on bulb 30 will cause further contraction of the element 40 bringing the link 54 into contact with switch 59 and thus, actuating the heat exchanger as a heating device.

Although the foregoing description is necessarily of a detailed character, in order that the invention may be completely set forth, it is to be understood that the specific terminology is not intended to be restrictive or confining, and that various rearrangement of the parts and modifications of detail may be resorted to without departing from the scope or spirit of the invention as herein claimed.

I claim:

In a heat exchanger having a compartment in communication with an enclosed space and providing a path for returning air to said space and a second compartment positioned externally of said space and providing a path for circulating ambient air therethrough, the improvement comprising: a split bulb thermostat having an indoor-portion positioned in the path of return air and having an outdoor portion positioned in the path of ambient air; a control unit positioned in said first compartment; a single expansible-contractible power element in said unit; a pair of heat exchanger start-stop switches mounted in said unit; a switch actuating linkage pivotally mounted within said unit and connected at one end to said power element and constrained to move between said start-stop switches at the other end, said linkage being connected intermediate the said ends for movement in one direction to a resilient biasing member and for movement in the opposite direction to a resilient member and capillary tubes connecting said indoor portion and said outdoor portion of said split-bulb to the other end of said power element, said indoor portion of said split bulb being proportioned relative to said outdoor portion such that said indoor portion effects approximately 90 percent of the control of said unit.

References Cited

UNITED STATES PATENTS

| | | | |
|---|---|---|---|
| 1,988,495 | 1/1935 | Hulse et al. | 165—28 |
| 2,417,761 | 3/1947 | Kleen | 165—28 |
| 2,998,707 | 9/1961 | Meess et al. | 62—208 |

ROBERT A. O'LEARY, *Primary Examiner.*

CHARLES SUKALO, *Examiner.*